United States Patent

[11] 3,580,380

| [72] | Inventor | Bryce W. Phillips<br>Henrico County, Va. |
|---|---|---|
| [21] | Appl. No. | 759,139 |
| [22] | Filed | Sept. 11, 1968 |
| [45] | Patented | May 25, 1971 |
| [73] | Assignee | Reynolds Metals Company<br>Richmond, Va. |

[54] METHOD OF AND APPARATUS FOR ORIENTING INDICIA BEARING CYLINDRICAL OBJECTS
15 Claims, 13 Drawing Figs.

[52] U.S. Cl. .................................................. 198/33,
250/219, 250/223
[51] Int. Cl. ..................................................... B65g 47/24,
G01n 21/28
[50] Field of Search ......................................... 198/33
(R2), 33 (R4), 33, 165; 250/219, 223

[56] References Cited
UNITED STATES PATENTS

| 3,074,531 | 1/1963 | Pechy | 198/33(.4) |
| 3,415,350 | 12/1968 | Murphy | 198/33(.2) |

*Primary Examiner*—Trygve M. Blix
*Attorney*—Glenn, Plamer, Lyne, Gibbs & Thompson

ABSTRACT: Indicia bearing cylindrical objects are oriented prior to being grouped and packaged so that the oriented objects provide their own advertising. In one embodiment, the objects are both rotated and translated as they traverse a plurality of inspection stations, each of which inspects less than a complete revolution of the object but the total of which inspects more than a complete revolution. Whenever any station produces a coincidence signal, rotation of the object is stopped to permit oriented grouping. In another embodiment, the objects do not rotate until after a coincidence signal is produced by comparison with a segment of the decorated object. Thereafter, a measured rotation is imparted to the object so that it is positioned in a desired orientation for grouping.

INVENTOR
Bryce W. Phillips

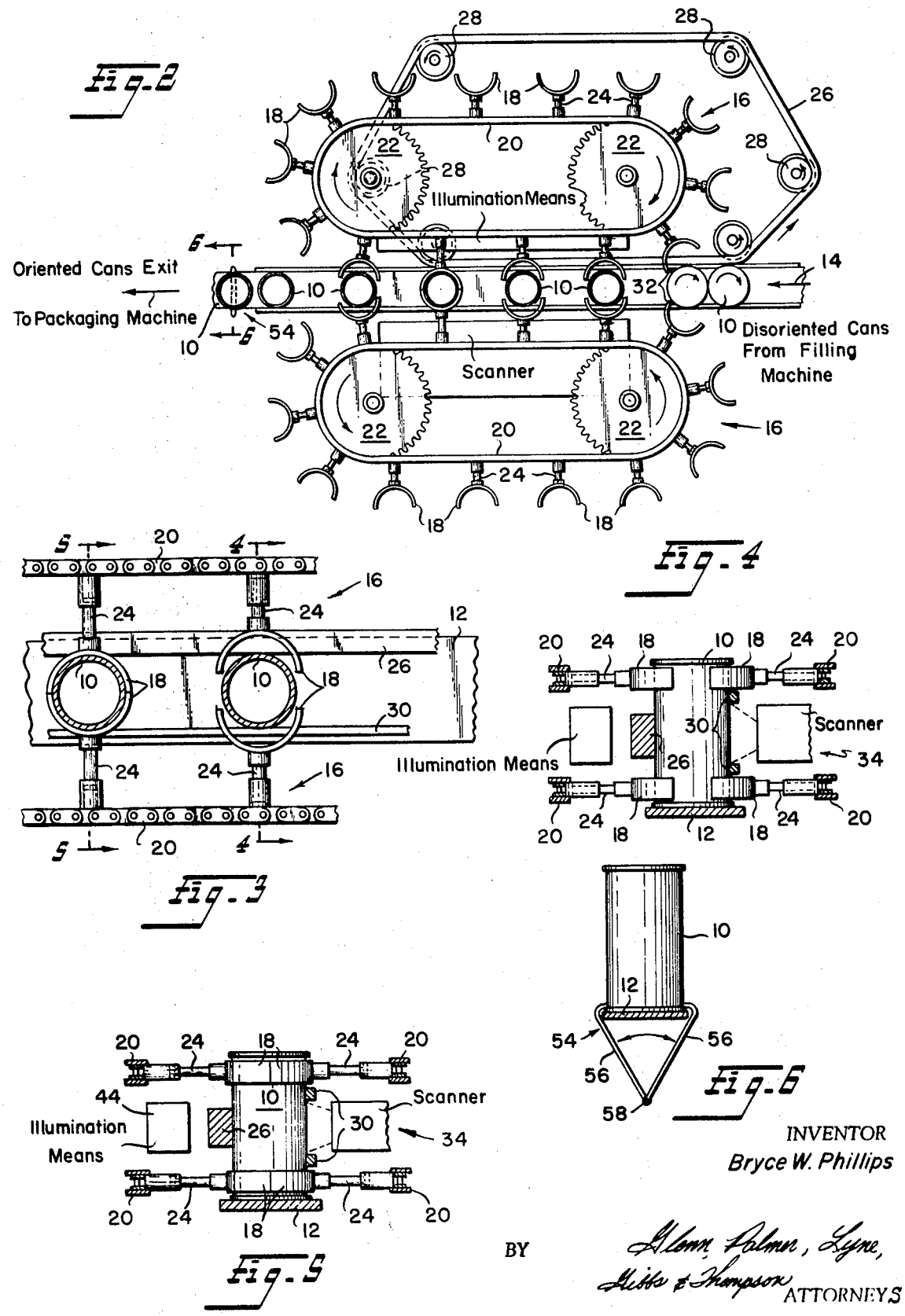

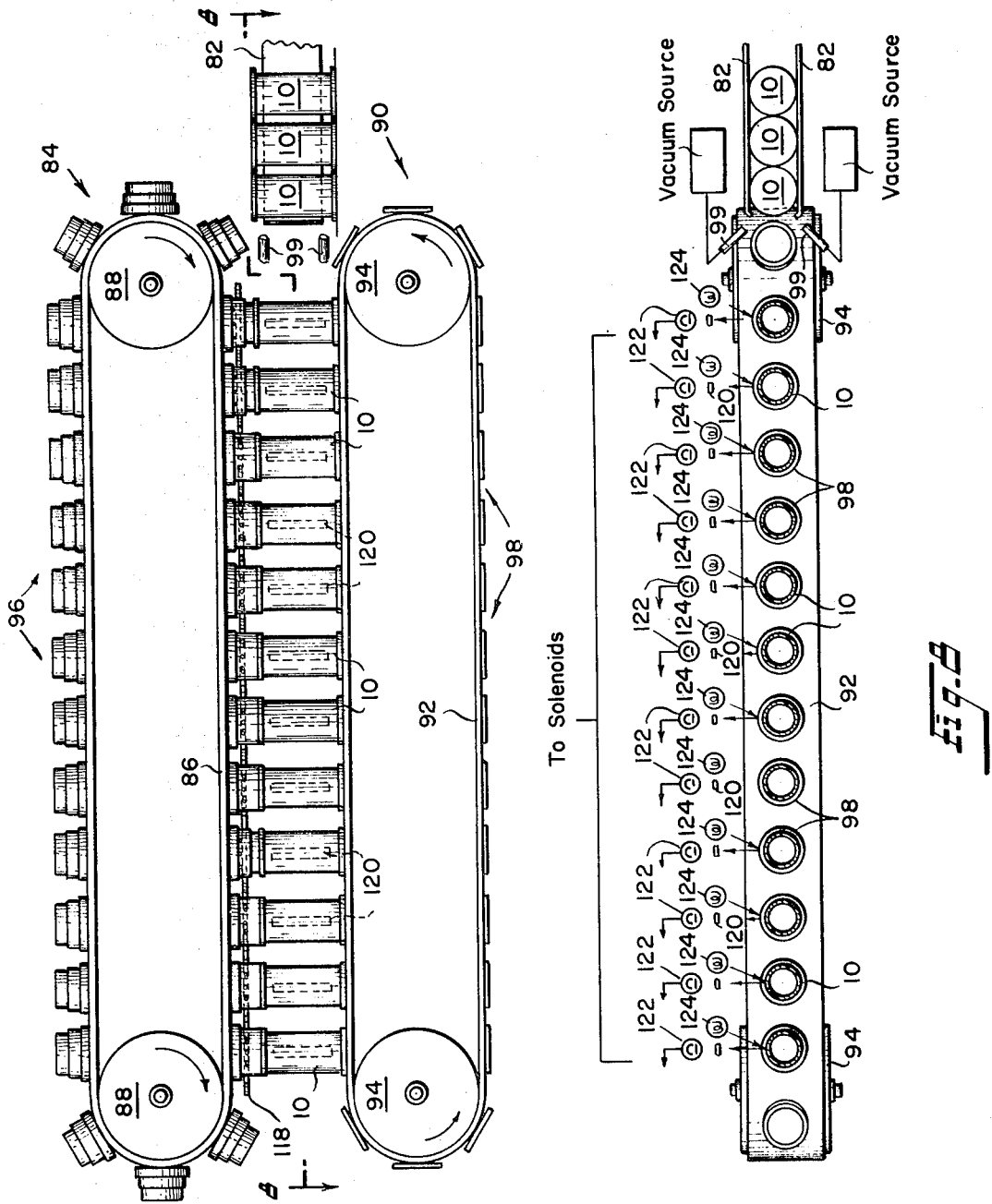

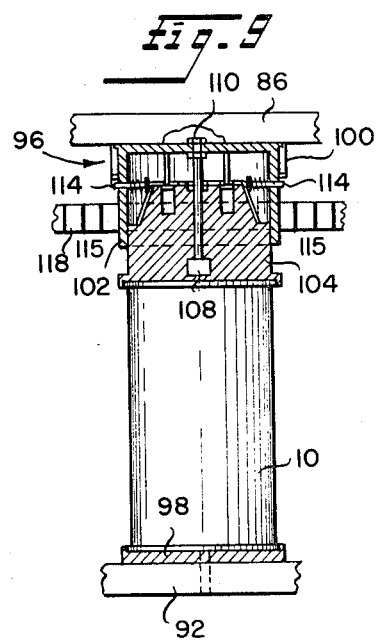
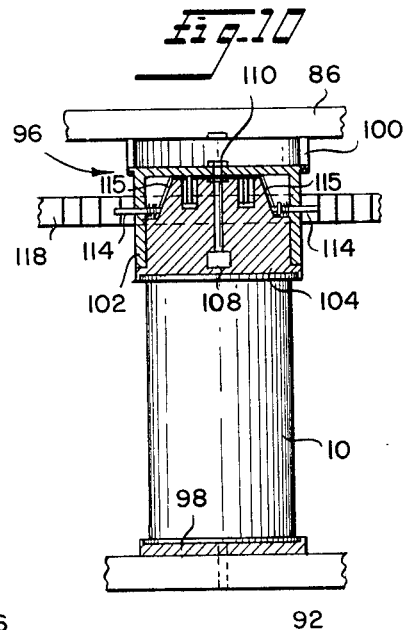
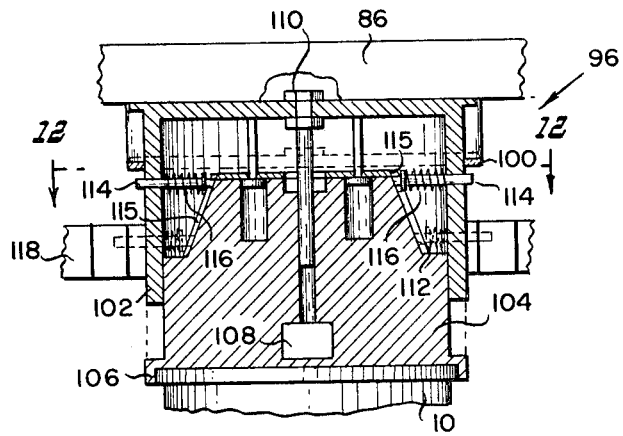
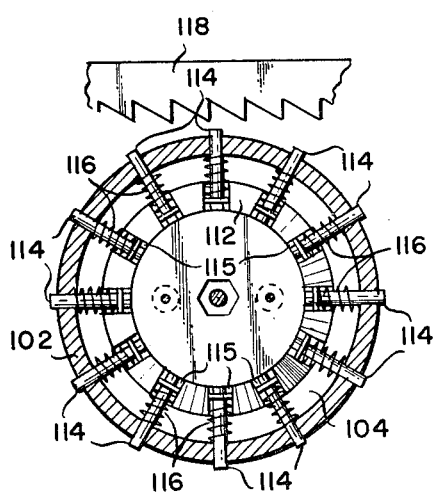
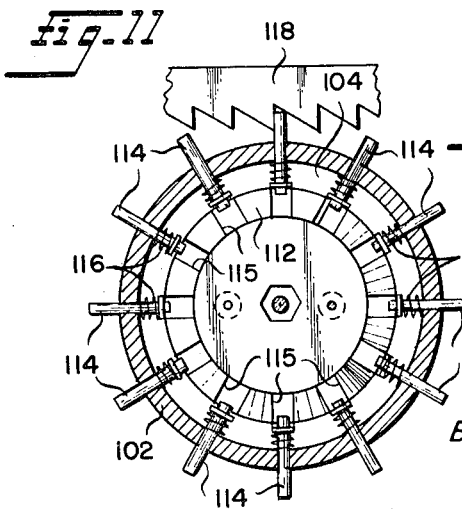
INVENTOR
Bryce W. Phillips

METHOD OF AND APPARATUS FOR ORIENTING INDICIA BEARING CYLINDRICAL OBJECTS

This invention relates to a method of and apparatus for orienting cylindrical objects and, more particularly, for orienting indicia bearing cylindrical objects which may then be grouped and packaged in such a manner that the oriented indicia on the objects enhances the advertising thereof when placed on a shelf.

Heretofore, cylindrical objects such as cans and bottles have been oriented by detection of certain discontinuities on their surface such as the side seam of a can or by an indentation, or the like deliberately placed on the surface of bottles. The orienting effected in the present invention is not dependent on the detection of any surface irregularity on the cylindrical object.

Other attempts which have been made in orienting cylindrical objects have tried to perform the entire detection of a desired orientation in a single detection or inspection station. Because of the requirements for handling of cylindrical objects at greatly increased speeds, such as 1,200cans per minute, the attempt to perform the entire detection at a single station becomes more and more difficult. Stated from a slightly different point of view, the electronics required to perform the inspection becomes increasingly sophisticated.

It is, therefore, a primary purpose of the present invention to cope with the increased speeds of article feeding without requiring a concomitant increased sophistication in the electronic means used to detect and provide for a desired orientation of the articles.

In one form of the invention disclosed herein, this is accomplished by rotating the cylindrical objects about their longitudinal axis with means to stop the rotation when a predetermined signal is obtained at which time each object is in a desired orientation and is maintained in this oriented position as it is passed to a receiving conveyor. When the objects are being rotated they more along a predetermined path past sensor elements located at a plurality of stations adjacent the path. By permitting each sensor element to track indicia on the cylindrical objects for less than a single revolution and effecting one or more hand-offs or continuations of the tracking by next adjacent sensor elements, it becomes possible to maintain relative simplicity in the electronic means. The combined tracking by the multiple station sensor elements totals at least one complete revolution for each cylindrical object.

In another form of the invention, the cylindrical objects are moved along a predetermined path and once again relative rotative movement occurs between indicia on the cylindrical object and sensor elements located at a plurality of stations adjacent the predetermined path. However, in this form of the invention, the cylindrical objects are moved in a predetermined path in nonrotating fashion past a plurality of sensor elements, each of which is tuned for or representative of a different orientation of the cylindrical objects. There are a sufficient number of sensor elements so that a coincidence signal is produced from each passing cylindrical object at some point during its traverse of the battery of sensor elements regardless of the particular or specific orientation of a cylindrical object. By knowing which sensor element has produced the coincidence signal, it becomes a simple matter to rotate the cylindrical object from its original orientation to a desired orientation. This may be effected by rotating the cylindrical object less than a complete revolution.

In both forms of the invention it is desired to group the oriented cylindrical objects so as to enhance their own advertising by virtue of the oriented indicia thereon. One such way of accomplishing this, for example, is to encapsulate the grouped, oriented objects in a transparent wrapper such as a heat-shrinkable plastic film.

The inherent advantages and improvements of the present invention will become more readily apparent upon considering the following detailed description of the invention and by reference to the drawings, in which:

FIG. 2 is a plan view of a can-gripping mechanism used in the present invention and being partially in cross section;

FIG. 3 is a fragmentary plan view illustrating individual gripping members of FIG. 2 drawn to an enlarged scale;

FIG. 4 is a vertical cross-sectional view taken along line 4-4 of FIG. 3;

FIG. 5 is a vertical cross-sectional view taken along line 5-5 of FIG. 3;

FIG. 6 is a vertical cross-sectional view taken along line 6-6 of FIG. 2;

FIG. 7 is a side elevation view, schematic in nature, of another embodiment of this invention;

FIG. 8 is a top plan view in horizontal cross section taken along line 8-8 of FIG. 7;

FIG. 9 is a vertical cross-sectional view of a can-holding means in FIG. 7 drawn to an enlarged scale;

FIG. 10 is a vertical cross-sectional view of the can-holding means in FIG. 8 illustrating a second position thereof;

FIG. 11 is a fragmentary vertical cross-sectional view of a can-holding means of FIGS. 9 and 10 drawn to an enlarged scale;

FIG. 12 is a fragmentary horizontal cross-sectional view taken along line 12-12 of FIG. 11, illustrating a second position of the can-holding means; and, FIG. 13 is a fragmentary horizontal cross-sectional view taken along line 12-12 of FIG. 11, illustrating a second position of the can-holding means.

Figure 1:
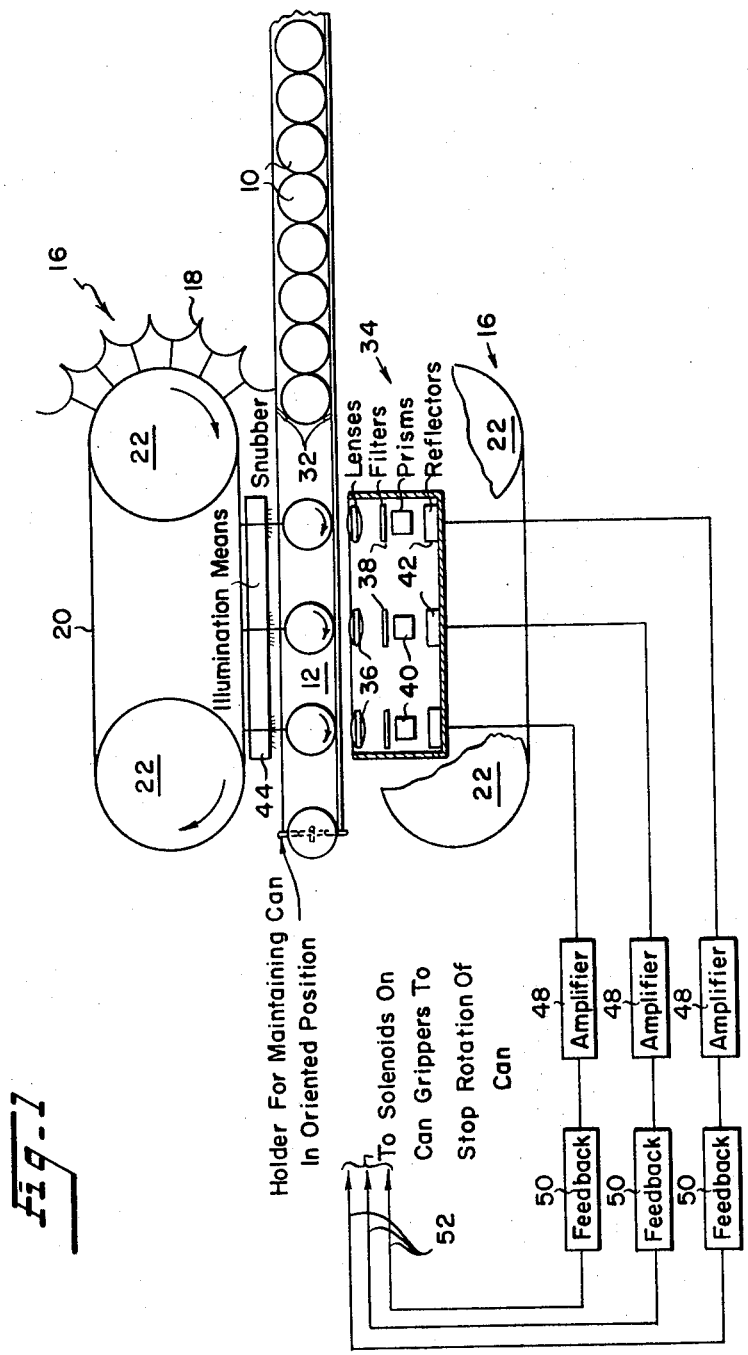
FIG. 1 is a plan view schematically illustrating the general arrangement with parts broken away and partially in cross section.

While the invention is shown and described with respect to cans, it will be appreciated that the principles thereof are applicable to cylindrical objects generally. Furthermore, because a primary purpose is to avoid unnecessary sophistication in the electronic means for acting on a coincidence signal, it will be apparent that a large number of various electrical circuitry systems may be used to facilitate the conversion of a coincidence signal into a desired orientation of a given can.

As used in this specification, the term "indicia bearing" is intended to include labeled, printed, lithographed or otherwise decorated cylindrical objects.

Referring now to FIG. 1 of the drawings, there is illustrated a plurality of cylindrical objects, such as cans indicated generally at 10, which are fed forward along conveyor 12, as seen best in FIGS. 3—6, in the direction indicated by arrow 14 toward a cooperating pair of can-gripping means indicated generally at 16.

As seen best in FIG. 2, each can-gripping means 16 comprises a plurality of can-gripping elements 18 carried by chains 20 which are driven around sprockets 22 in the direction indicated by the arrows in FIG. 2 by conventional drive means, not shown.

The can gripping elements 18 are supported from the chains 20 at the end of a reciprocable piston on solenoids 24 for a purpose hereinafter defined. In this form of the invention, means are provided for rotating the cans as they approach the can-gripping elements 18 such as a friction belt 26. Friction belt 26 is driven over a plurality of pulley wheels by drive means, not shown, in synchronism with the conveyor 12. A pair of snubber means 32 hod cans 10 momentarily until such time as they are picked off therefrom by can-gripping elements 18 and fed to the left as viewed in FIG. 2. The snubber means 32 may comprise conventional vertically retractable pins which are withdrawn from the path of the oncoming cans 10 in synchronism with the rotating advance of can-gripping elements 18 on the cooperating pair of can-gripping means 16.

The cans 10 are engaged by the friction belt means 26 for a sufficient distance in advance of a scanner means indicated generally at 34 to bring the cans 10 into sufficiently rapid rotating movement so that each can will make at least one complete revolution before it traverses the plurality of inspection stations in scanner means 34.

Thus, referring to FIG. 1 there is illustrated three separate stations in scanner means 34, each station of which is shown to have a lens 36, a filter 38, a prism 40 and a reflector element 42. Each of the elements constituting a single inspection station such as the lens 36, filter 38, prism 40 and reflector 42 may be rotatable or oscillatable so as to achieve its visual scanning function accomplished with the aid of an illuminating means 44. It is to be understood that the illumination means 44 may constitute a photoelectric cell or it may completely or substantially envelop the rotating cans 10 on conveyor 12 whereby reflected light may be used. Monochromatic light or other special light may be used. The detection station receives a coincidence signal or major impulse when a particular, predetermined orientation of the can 10 is reached as it passes the scanner means 34. It will be observed that each can 10 travels not only linearly under the influence of conveyor 12 but also rotates under the influence of friction belt 26. When the coincidence of major impulse signal is received it is passed directly to an associated amplifier 48. The amplified signal is then taken by associated feedback means 50, as indicated, by arrows 52, to the solenoids 24 on can-gripping elements 18 which instantly stop the rotation of the can by moving from the position of FIG. 4 to the position illustrated in FIG. 5. FIG. 3 also shows one can on the left in this figure which has been stopped by means of the can-gripping elements 18 and a can on the right which has not yet produced a coincidence signal so that it has not yet been stopped.

One means for handling a coincidence signal is illustrated in Cummings et al. U.S. Pat. No. 2,783,389 which issued on Feb. 26, 1957 which is hereby incorporated by reference. Means such as this or any other suitable means may be used to handle the signal obtained by the inspection stations of the scanner 34.

After the solenoid 24 for a particular can-gripping element 18 has been actuated, the gripping elements 18 prevent further rotation by friction drive 26 which at this point simply slips past the can 10. The thus oriented can is held in this position until after it passes out of engagement with friction belt 26 after which the can is released by separation of the gripping elements 18. This may be accomplished by an electrical signal to the can-gripping elements 18 to withdraw the arm of the solenoid so as to arm the can-gripping elements for subsequent engagement with an oncoming can. Thereafter, the oriented can 10 is engaged by a holder, indicated generally at 54, for maintaining the can in oriented position.

Reference to FIG. 6 shows that holder 54 is provided with a pair of spring-loaded arms 56 which pivot about pivot point 58. The containers are held in the oriented position by means of holders 54 until they are fed to a packaging machine, at which point they are grouped into convenient groups such as two rows of three forming a convenient conventional six-pack. At this point they are suitably packaged so that the oriented indicia on the objects enhances their own advertising. One such way of packaging the objects is to encapsulate them in an open-ended tube of thermoplastic heat-shrinkable film whereby the containers are completely encapsulated and held together as a unit providing their own advertising.

Referring now to FIG. 7 of the drawings, there is illustrated a second embodiment of this invention wherein a can-guiding means 82 feeds a series of cans 10 at high speed into an upper can holder means 84 which comprises a conveyor means 86 entrained around sprockets or pulleys 88. A lower can holder means is indicated generally at 90 which comprises a conveyor means 92 which is driven around sprockets 94 in the direction shown by the arrows thereon.

The upper can holder means 84 is provided with upper can holder elements indicated generally at 96 and a lower can holder means at 90 is provided with lower can holder pocket elements indicated generally at 98. A vacuum transfer device 99, or other conventional means, may be used to effect transfer from the can-guiding means 82 to the upper and lower can holder means 84, 90, respectively.

Reference to FIGS. 9 through 13 illustrate the upper and lower can holder elements 96, 98 in more detail. Thus upper can holder element 96 is shown to have a guide 100 which receives a reciprocable cup 102 which in turn slides on an upper can holder element 104. The latter element is provided with an annular flange 106, seen best in FIG. 11, for reception therein of the upper or lower periphery of the can 10.

Upper can holder element 104 carries a solenoid 108 which is connected at 110 to the reciprocable cup 102. Upper can holder element 104 is provided with a slotted conical camming surface 112 and is provided with a plurality of pinion means such as pins 114 which ride in the slots thereof. Pins 114 extend through apertures in the reciprocable cup 102 and are spring-biased by springs 116 to ride in the slots 115 of conical camming surface 112 in upper can holder element 104. Upon actuation of solenoid 108 in the manner described hereinafter, the reciprocal cup member 102 moves from the FIG. 9 position to the FIG. 10 position in which latter position pins 114 are thrust outwardly into engagement with the teeth of a rack 118. The pins 114 are so spaced around the periphery of the conical camming surface 112 of upper can holder element 104 that they engage with the teeth so that with the advance of an individual can 10 forwardly by the conveyor means 86 and 92 the can 10 is rotated.

Referring now to FIG. 8, there is indicated a plurality of inspection stations each of which contains a segment of the label or printing material indicia contained on a can passing by. For convenience of explanation, it may be considered that each comparison unit 120 consists of a vertical segment of a label or printed indicia on the can. A source of light 122 and photocell 124 is associated with each inspection station, with the reflected light passing through the comparison unit 120 before contact its associated photocell 124. A scanning unit such as is illustrated in 34 may be associated with each scanning unit and the coincidence signal obtained by the photocell may be handled in the manner illustrated in Cummings et al. U.S. Pat. No. 2,783,389, for other alternate means with the output being applied to the solenoid 108 for each individual can 10.

In operation a plurality of cans fed to the upper and lower can holder means 84—90 where they are firmly grasped by the upper can holder element and lower can holder element 98, the cans are fed from right to left in FIGS. 7 and 8 by means of conveyor means 86, 92 past the plurality of inspection stations where the original or particular orientation of a can is compared with the comparison unit 120 in order to determine the particular orientation of the can. Whenever a particular can's orientation matches that of a comparison unit 120, a coincidence signal is produced and this signal is used to actuate solenoid 108 for that can thereby effecting a downward movement of reciprocable cup 102 from the FIG. 9 position to the FIG. 10 position. At this point pinion means, consisting of pins 114, engage the teeth of rack 118 thereby causing the can to rotate until it reaches the end of rack 118. It is a simple matter to control the length of rack 118 remaining from the point of actuation for a particular comparison unit 120 whereby the position of the can about its vertical axis may be brought to a desired orientation. In other words, after a coincidence signal is obtained at a particular comparison unit 120, the can is maintained under orientation control. When a can reaches the end of the rack 118 it has attained the desired orientation and the can may be maintained under orientation control by means of a holder 54 as illustrated in the first embodiment of the invention until such time as the cans have been arranged in groups for packaging so as to preserve their oriented position.

While a rack and pinion means has been illustrated for maintaining the orientation control after a coincidence signal has been received, any suitable apparatus may be employed. For example, a clutch and gear arrangement may be utilized wherein the coincidence signal is used to actuate a clutch and the can holders may be provided with one set of gears meshing with another set of gears whose length of rotation may be determined.

The invention is independent of any particular electronic means for handling the coincidence signal and converting it into means for orienting the cans. It is important to note, however, that by using a plurality of inspection stations the electronic means need not become unduly sophisticated or complicated.

While it is possible in each embodiment of the invention to use comparison units 120 which are representative of adjacent vertical segments of the label or printed material contained on a can and to have them arranged in consecutive order, neither of these limitations are essential. Thus, it is possible to use any means which will identify a particular orientation on a can whether horizontal or vertical or any desired combination thereof in order to produce a coincidence signal indicative thereof, and it is likewise possible simply to arrange the particular inspection station associated with a given orientation of a can a known distance from the end of the rotating blank so that the controlled orientation may be preserved.

While presently preferred embodiments of the invention have been illustrated and described, it will be recognized that the invention may be otherwise variously embodied and practiced within the scope of the claims which follow.

I claim:

1. A method of orienting indicia bearing cylindrical objects comprising the steps of
   a. moving a series of cylindrical objects along a predetermined path,
   b. causing relative rotative movement between indicia on said cylindrical objects and sensor elements located at a plurality of stations adjacent said predetermined path,
   c. tracking the indicia on said cylindrical objects for less than a single revolution thereof at each of said stations;
   d. and, thereafter, positioning and holding each cylindrical object in a predetermined oriented position whereby groups of said oriented cylindrical objects may be packaged.

2. A method of orienting indicia bearing cylindrical objects as defined in claim 1 wherein said cylindrical objects are rotated about their longitudinal axes while moving along said predetermined path.

3. A method of orienting indicia bearing cylindrical objects as defined in claim 1 wherein one sensor element picks up the tracking of an individual cylindrical object substantially at the point at which the previous sensor element stops tracking.

4. A method of orienting indicia bearing cylindrical objects as defined in claim 3 wherein the combined tracking of said sensor elements at said plurality of stations totals at least one complete revolution for each cylindrical object.

5. A method of orienting indicia bearing cylindrical objects as defined in claim 1 wherein said cylindrical objects are maintained in nonrotating relationship until after said sensor elements have determined its orientation.

6. A method of orienting indicia bearing cylindrical objects as defined in claim 5 wherein each sensor element compares a portion of each labeled or printed cylindrical object with a predetermined segment thereof in order to produce a coincidence signal.

7. A method of orienting indicia bearing cylindrical objects as defined in claim 6 including the steps of rotating each cylindrical object to a desired oriented position after obtaining a coincidence signal from at least one of said sensor elements.

8. A method of orienting indicia bearing cylindrical objects as defined in claim 7 wherein each cylindrical object is rotated less than one revolution thereof after a coincidence signal has been obtained.

9. Apparatus for orienting indicia bearing cylindrical objects comprising:
   a. conveyor means for moving labeled or printed cylindrical objects along a predetermined path,
   b. a plurality of inspection stations positioned adjacent said predetermined path,
      1. each of said inspection stations having an individual sensor element capable of producing a coincidence signal when one of said cylindrical objects is oriented in a predetermined position with respect thereto,
   c. means for causing relative rotative movement between said cylindrical objects and said sensor elements,
   d. and means responsive to a coincidence signal from at least one said sensor elements for positioning and holding each cylindrical object in a predetermined oriented position whereby groups of said cylindrical objects may be packaged in a desired oriented position.

10. Apparatus for orienting indicia bearing cylindrical objects as defined in claim 9 including means engageable with said cylindrical objects for imparting rotation thereto as said conveyor means provides translation to said cylindrical objects.

11. Apparatus for orienting indicia bearing cylindrical objects as defined in claim 10 wherein said means responsive to a coincidence signal for positioning and holding each cylindrical object includes solenoid-actuated gripping means.

12. Apparatus for orienting indicia bearing cylindrical objects as defined in claim 10 wherein said means engageable with said cylindrical objects for imparting rotation thereto includes belt drive means engageable with one side of said cylindrical objects while guide means engages an opposed side of said cylindrical objects.

13. Apparatus for orienting indicia bearing cylindrical objects as defined in claim 9 wherein consecutive sensor elements produce coincidence signals for adjacent vertical segments of an individual cylindrical object.

14. Apparatus for orienting indicia bearing cylindrical objects as defined in claim 13 including means for rotating an individual cylindrical object to a desired oriented position only after coincidence signal has been received by one of said sensor elements.

15. Apparatus for orienting indicia bearing cylindrical objects as defined in claim 14 wherein said means for rotating an individual cylindrical object to a desired oriented position constitutes a rack engageable by pinion means carried by said cylindrical object.